United States Patent
Chen et al.

(10) Patent No.: US 8,494,603 B2
(45) Date of Patent: Jul. 23, 2013

(54) OPERATION DEVICE FOR CONTROLLING SLIDING COVER OF PORTABLE ELECTRONIC PRODUCT

(75) Inventors: Jung-Pin Chen, Kaohsiung Hsien (TW); Shu-Chen Lin, Kaohsiung Hsien (TW); Shan-Yao Chen, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 369 days.

(21) Appl. No.: 12/851,920

(22) Filed: Aug. 6, 2010

(65) Prior Publication Data

US 2011/0045880 A1    Feb. 24, 2011

(30) Foreign Application Priority Data

Aug. 18, 2009  (TW) ............................... 98127801 A

(51) Int. Cl.
  *H04M 1/00*  (2006.01)
(52) U.S. Cl.
  USPC ..................................... 455/575.4; 455/550.1
(58) Field of Classification Search
  USPC .......... 455/575.1, 550.1, 575.2–575.4, 575.8; 361/679.55, 679.56, 730, 810, 679.01, 679.12, 361/814, 752, 679.08, 727

See application file for complete search history.

(56) References Cited

U.S. PATENT DOCUMENTS

| 6,950,316 B2 * | 9/2005 | Pan et al. ...................... 361/814 |
| 7,136,688 B2 | 11/2006 | Jung et al. |
| 2005/0079902 A1 * | 4/2005 | Chen et al. ................. 455/575.4 |
| 2006/0109250 A1 * | 5/2006 | Prichard et al. ............... 345/168 |

* cited by examiner

*Primary Examiner* — Edward Urban
*Assistant Examiner* — Golam Sorowar
(74) *Attorney, Agent, or Firm* — Rosenberg, Klein & Lee

(57) ABSTRACT

An operation device for controlling sliding cover of portable electronic product includes first, second and third magnetic members, a transmission unit and an operation unit. The third magnetic member is connected to the transmission unit and includes first and second magnetic polarities. The operation unit drives the transmission unit and the two magnetic members are fixed to the first and second positions of the sliding cover. When the operation unit is operated, the third magnetic member is rotated so that the first magnetic polarity of the third magnetic member is impulsive to the first magnetic member to open the sliding cover, or the first magnetic polarity of the third magnetic member is impulsive to the second magnetic member to close the sliding cover.

6 Claims, 4 Drawing Sheets

OPERATION DEVICE FOR CONTROLLING SLIDING COVER OF PORTABLE ELECTRONIC PRODUCT

FIELD OF THE INVENTION

The present invention relates to an operation device for controlling sliding cover of portable electronic product, and more particularly, to a single operation device to open and to close the sliding cover.

BACKGROUND OF THE INVENTION

A conventional portable electronic product with a sliding cover, such as a cellular phone with a sliding cover, comprises a body which has an input unit such as a key pad, and the sliding cover is slidably mounted to the body so as to cover the input unit of the body to prevent from unintentionally touch of the keys.

The way that the sliding cover is opened and closed can be manual, semi-auto and fully automatic, wherein the manual operation is operated by the user's hand to move the sliding cover to a desired position.

For the semi-auto operation system, U.S. Pat. Pub. No. 2005/0079902 to Chen et al., discloses a "Positioning apparatus and method for a slide cover" which comprises a first magnetic component of a first magnetic polarity configured on a first plate and a second magnetic component of the first magnetic polarity configured on the first plate, and a third magnetic component of a second magnetic polarity which attracts the first magnetic polarity and is configured on a second plate. When a relative position between the first plate and the second plate is changed to make a magnetic attraction between the first magnetic component and the third magnetic component be greater than a magnetic attraction between the second magnetic component and the third magnetic component, the second plate and the first plate moves relatively and is positioned in a first position. When the relative position between the first plate and the second plate is changed to make the magnetic attraction between the first magnetic component and the third magnetic component be less than the magnetic attraction between the second magnetic component and the third magnetic component, the second plate and the first plate moves relatively and is positioned in a second position. The sliding mechanism for the sliding cover has to be operated by the user to shift the sliding cover a distance relative to the body, the sliding cover can be moved by the user's force. The sliding cover is positioned by the attraction of the magnetic members between the body and the sliding cover.

For the fully automatic sliding cover, Jung et al. disclose "Slide type cellular phone an d sliding method thereof" in U.S. Pat. No. 7,136,688 and which discloses a first main body having a motor with a shaft and an elastic member elastically supports the motor. A switch activates the motor. A power transmitting unit is coupled to the shaft of the motor to receive a rotation power from the motor. A pinion is coupled to the power transmitting unit to be rotated by the rotation power. A second main body is slidably coupled to the first main body and has a rack coupled to the pinion and sliding with respect to the first main body according to movements of the pinion and the rack. A sliding detecting unit detects a termination of a sliding operation of the second main body to control the motor. The cover is operated by the power from the motor and the operation of the motor consumes the electric power of the battery and reduces the operation time of the cellular phone.

In addition, the motor includes multiple electronic parts and mechanical parts so that impacts to the motor may damage it.

SUMMARY OF THE INVENTION

The present invention intends to provide an operation device for controlling sliding cover of portable electronic product and which improves the drawbacks of the conventional sliding covers.

The present invention relates to an operation device for controlling a sliding cover of a portable electronic product, and the device comprises a body and a sliding cover is slidably and linearly connected to the body. A first magnetic member is fixed to a first position of the sliding cover and the first magnetic member has a first magnetic polarity. A second magnetic member is fixed to a second position of the sliding cover and the first position is located at a distance from the second position. The second magnetic member has a first magnetic polarity. A transmission unit is connected to the body and has a first part, a second part and a third part. The third part is threadedly connected between the first and second parts. An operation unit is connected to the first part. A third magnetic member is connected to the second part and has a first magnetic polarity and a second magnetic polarity. The first and second polarities of the third magnetic member are located corresponding to the first magnetic polarity of the first magnetic member and the first magnetic polarity of the second magnetic member. The three respective first magnetic polarities are magnetically repulsive to each other. The second magnetic polarity of the third magnetic member is magnetically attracted to the three respective first magnetic polarities. The transmission unit is activated by operation of the operation unit and the third magnetic member is pivoted by the transmission unit so that positions of the first and second magnetic polarities of the third magnetic member are switched.

The first part includes a first toothed portion and the second part includes a second toothed portion. The third part includes a third toothed portion and a fourth toothed portion. The third toothed portion is engaged with the first toothed portion of the first part and the fourth toothed portion is engaged with the second toothed portion of the second part.

A fixed part is fixed to the second part and the third magnetic member is connected to the fixed part.

The present invention provides another embodiment of the operation device for controlling sliding cover of portable electronic product, wherein the operation device comprises a body and a sliding cover is slidably and linearly connected to the body. A first magnetic member is fixed to a first position of the sliding cover and a second magnetic member is fixed to a second position of the sliding cover. The first position is located at a distance from the second position. The first magnetic member and the second magnetic member are magnetically impulsive to each other. A third magnetic member is pivotably connected between the first and second positions. The third magnetic member has at least a first magnetic polarity which is magnetically impulsive to the first and second magnetic members. A position of the first magnetic polarity is switched to be located corresponding to one of the first and second magnetic members when the third magnetic member is rotated. The third magnetic member has a second magnetic polarity which is located corresponding to the first magnetic polarity. The first and second magnetic polarities are magnetically repulsive to each other. The second magnetic polarity is magnetically attracted to the first and second magnetic members.

A transmission unit is pivotably connected to the body and located between the first and second positions of the slide member. An operation unit is connected to the transmission unit and pivots the transmission unit. The third magnetic member is connected to the transmission unit which is rotated by operation of the operation unit. The transmission unit switches the first and second magnetic polarities.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
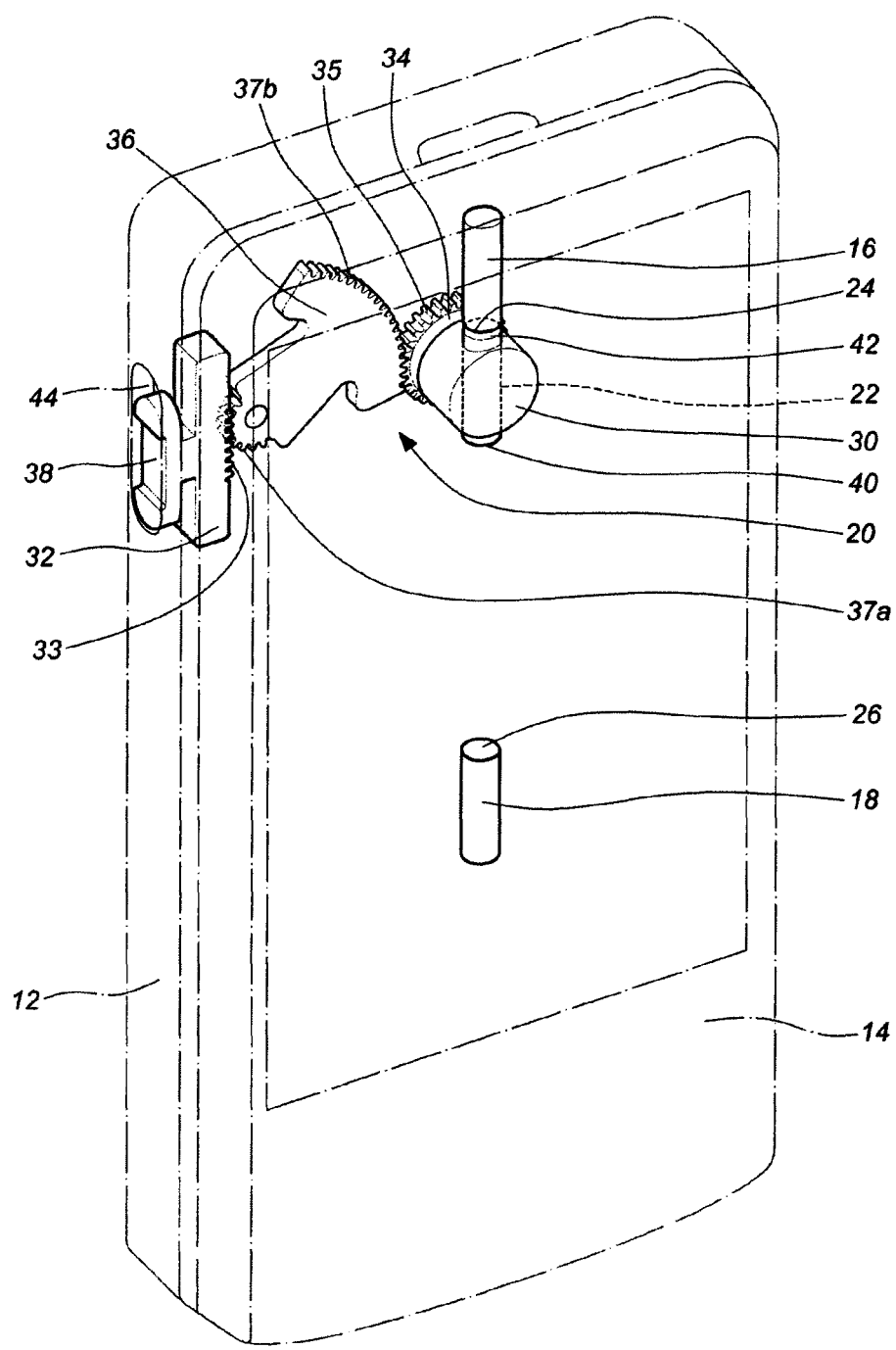
FIG. 1 shows that the operation device of the present invention connected to a cellular phone with a sliding cover.

FIG. 1 shows an electronic device such as a cellular phone that comprises a body 12 and a sliding cover 14 is slidably and linearly connected to the body 12. A first magnetic member 16 is fixed to a first position of the sliding cover 14 and a second magnetic member 18 is fixed to a second position of the sliding cover 14. The second position is located away from the first position. A transmission unit 20 is connected to the body 12. A third magnetic member 22 is connected to the transmission unit 20 and the polarities of the third magnetic member 22 is switched to be located corresponding to the first and second magnetic members 16, 18 by the transmission unit 20.

The first magnetic member 16 has a first magnetic polarity 24, such as N polarity or S polarity. In this embodiment, the first magnetic polarity 24 is N polarity.

The second magnetic member 18 has a first magnetic polarity 26 which has the same magnetic polarity with the first magnetic polarity 24 of the first magnetic member 16.

The transmission unit 20 comprises a first part 32, a second part 34 and a third part 36, wherein the third part 36 is threadedly connected between the first and second parts 32, 34. A fixed part 30 is fixed to the second part 34. The first part 32 includes a first toothed portion 33 and the second part 34 includes a second toothed portion 35. The third part 36 includes a third toothed portion 37a and a fourth toothed portion 37b. The third toothed portion 37a is engaged with the first toothed portion 33 of the first part 32 and the fourth toothed portion 37b is engaged with the second toothed portion 35 of the second part 34. In this embodiment, the first, second and third parts 32, 34, 36 form a transmission mechanism. Preferably, the first part 32 has an operation unit 38 which is exposed on the body 12 so that the user can operate the operation unit 38 to drive the first part 32. The operation unit 38 and the first part 32 can be an integral part or two individual parts connected to each other.

Preferably, the third magnetic member 22 is fixed to the fixed part 30 and has at least a first magnetic polarity 40, such as N polarity, or has at least a second magnetic polarity 42 such as S polarity. Wherein, the first magnetic polarity 40 is located at its original position and corresponding to the first magnetic polarity 26 of the second magnetic member 18, and is magnetically impulsive to the first magnetic polarity 26 of the second magnetic member 18. The second magnetic polarity 42 of the third magnetic member 22 is located at its original position and corresponding to the first magnetic polarity 24 of the first magnetic member 16, and is magnetically attractive to the first magnetic polarity 24 of the first magnetic member 16.

The body 12 has a window 44 and the operation unit 38 is accessible through the window 44. The window 44 has a space that the operation unit 38 can be moved within that space. When the operation unit 38 is operated by the user, the transmission unit 20 is driven so as to drive the first and second polarities 40, 42 of the third magnetic member 22 to face the first and second magnetic members 16, 18.

Figure 2:
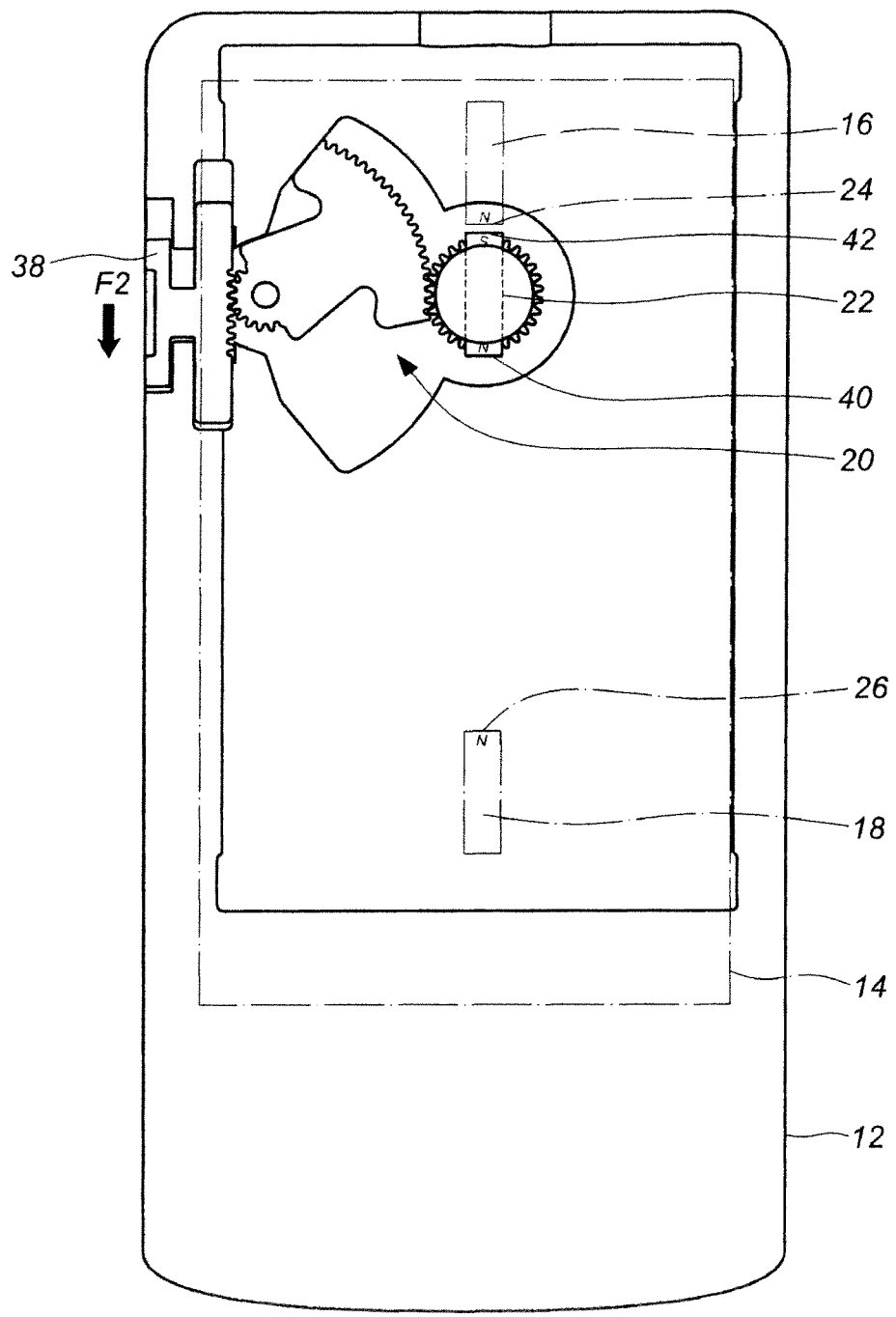
FIG. 2 shows that the sliding cover controlled by the operation device of the present invention is closed.

FIG. 2 shows that the sliding cover 14 is at a closed position of the body 12, wherein the first magnetic polarity 24 (N magnetic polarity, for example) of the first magnetic member 16 is attracted to the second magnetic polarity 42 (S magnetic polarity, for example) of the third magnetic member 22, so that the sliding cover d14 is firmly maintained at the closed position relative to the body 12.

Figure 3:
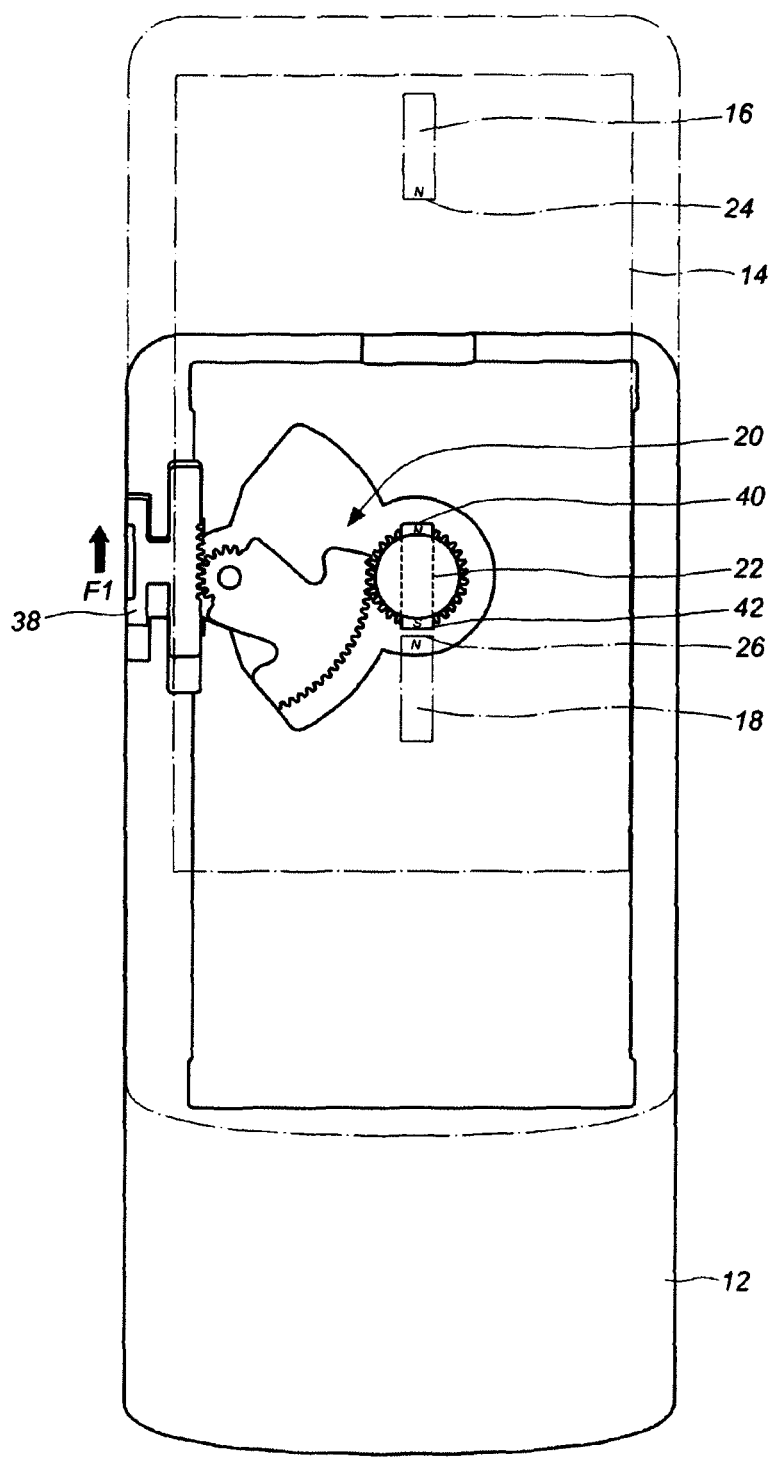
FIG. 3 shows that the sliding cover controlled by the operation device of the present invention is opened.

FIG. 3 shows that the sliding cover 14 is at an opened position of the body 12, wherein the operation unit 38 is shifted from its original position to the opened position of the window 44 along the first direction (the direction indicated by F1). The transmission unit 20 is rotated and the first magnetic polarity 40 (N magnetic polarity) of the third magnetic member 22 is rotated 180 degrees to a position facing the first magnetic polarity 24 (N magnetic polarity) of the first magnetic member 16, such that the first magnetic polarity 40 (N magnetic polarity) of the third magnetic member 22 is impulsive to the first magnetic polarity 24 (N magnetic polarity) of the first magnetic member 16. The second magnetic polarity 42 (S magnetic polarity) of the third magnetic member 22 is rotated to a position facing the first magnetic polarity 26 (N magnetic polarity) of the second magnetic member 18, such that the second magnetic polarity 42 (S magnetic polarity) of the third magnetic member 22 is attracted to the first magnetic polarity 26 (N magnetic polarity) of the second magnetic member 18. By this way, when the third magnetic member 22 of the body 12 is operated, the first magnetic polarity 40 is rotated 180 degrees from its original position to a position that faces the first magnetic polarity 24 (N magnetic polarity) of the first magnetic member 16. Because the first and third magnetic members 16, 22 are magnetically impulsive to each other, so that the sliding cover 14 is pushed, relative to the body 12, a distance by the impulsive force to move the first magnetic polarity 26 (N magnetic polarity) of the second magnetic member 18 close to the second magnetic polarity 42 (S magnetic polarity) of the third magnetic member 22. In this status, the second and third magnetic members 18, 22 are attracted to each other, so that the sliding cover 14 is automatically opened relative to the body 12 and maintained at the opened position.

When the user shifts the operation unit 38 along the second direction (as indicated by F2 in FIG. 2) from the opened position to the closed position in the window 44, the transmission unit 20 is rotated and the first magnetic polarity 40 (N magnetic polarity) of the third magnetic member 22 is rotated 180 degrees to a position facing the first magnetic polarity 26 (N magnetic polarity) of the second magnetic member 18, such that the first magnetic polarity 40 (N magnetic polarity) of the third magnetic member 22 is impulsive to the first magnetic polarity 26 (N magnetic polarity) of the second magnetic member 18. The second magnetic polarity 42 (S magnetic polarity) of the third magnetic member 22 is rotated to a position facing the first magnetic polarity 24 (N magnetic polarity) of the first magnetic member 16, such that the second magnetic polarity 42 (S magnetic polarity) of the third magnetic member 22 is attracted to the first magnetic polarity 24 (N magnetic polarity) of the first magnetic member 16. By this way, when the operation unit 38 is operated to close by the user, the third magnetic member 22 of the body 12 is operated, the first magnetic polarity 40 is rotated 180 degrees to a position that faces the first magnetic polarity 26 (N magnetic polarity) of the second magnetic member 18. Because the second and third magnetic members 18, 22 are magnetically impulsive to each other, so that the sliding cover 14 is moved backward, relative to the body 12, a distance by the impulsive force to move the first magnetic polarity 24 (N magnetic polarity) of the first magnetic member 16 close to the second magnetic polarity 42 (S magnetic polarity) of the third magnetic member 22. In this status, the first and third magnetic members 16, 22 are attracted to each other, so that the sliding cover 14 is automatically closed relative to the body 12 and maintained at the closed position.

Figure 4:
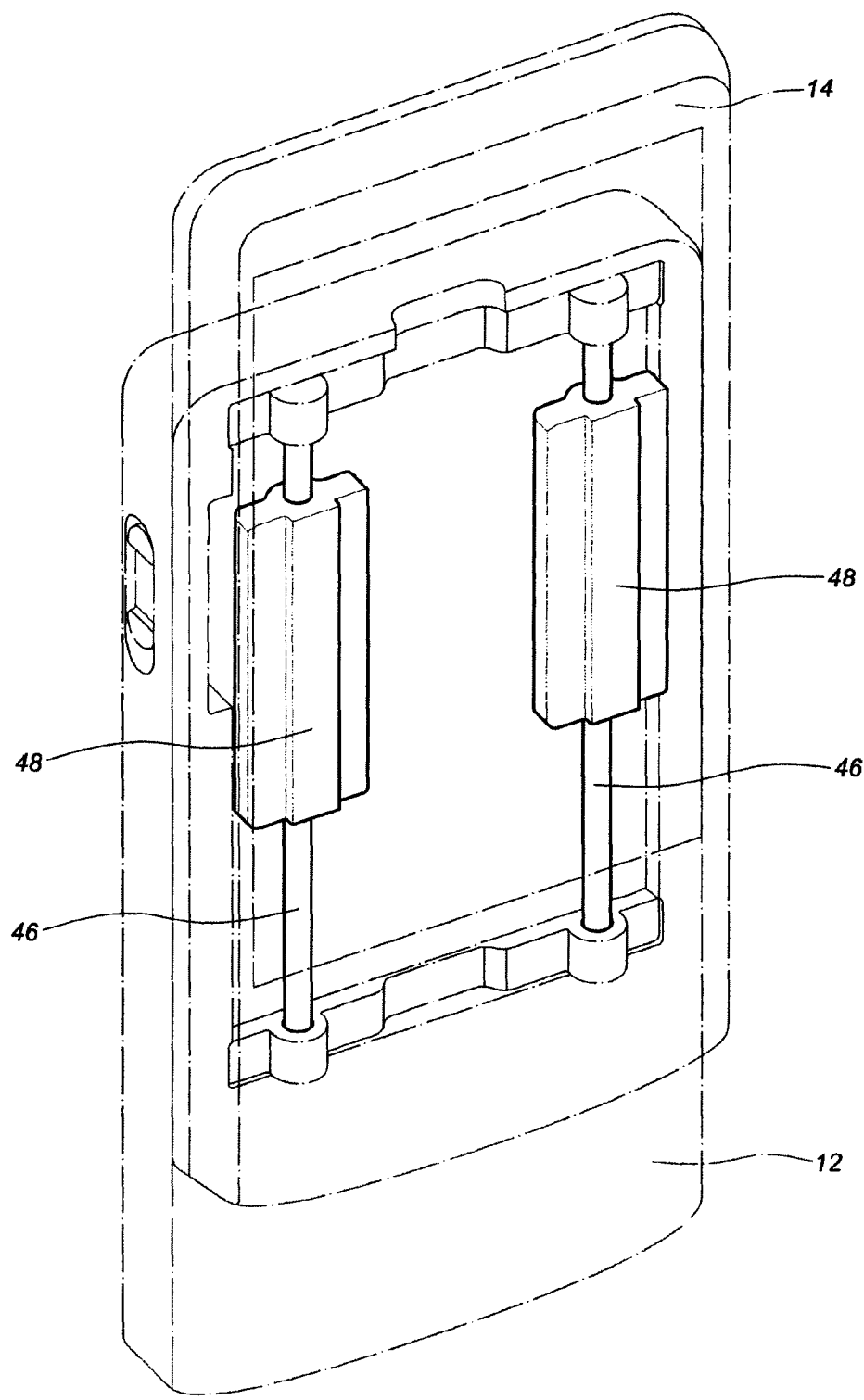
FIG. 4 shows that the sliding cover is moved along two guide rods.

FIG. 4 shows that the body 12 includes two straight guide rods 46 and the sliding cover 14 includes two slide members 48 which are respectively slidable on the guide rods 46, so that the sliding cover 14 is slidable relative to the body 12.

It is noted that the relative movement between the sliding cover 14 and the body 12 is one of the embodiments, other embodiments such as the use of balls or rollers or other known sliding mechanism can also achieve the desired purposes.

By controlling the operation unit 38, the sliding cover 14 is automatically opened or closed relative to the body 12. Especially, the power of the battery of the electronic product is not used when the sliding cover 14 is automatically opened or closed relative to the body 12.

While we have shown and described the embodiment in accordance with the present invention, it should be clear to those skilled in the art that further embodiments may be made without departing from the scope of the present invention.

What is claimed is:

1. An operation device for controlling sliding cover of portable electronic product, comprising a body and a sliding cover slidably and linearly connected to the body, the operation device comprising:
   a first magnetic member fixed to a first position of the sliding cover and the first magnetic member having a first magnetic polarity;
   a second magnetic member fixed to a second position of the sliding cover, the first position being located at a distance from the second position, the second magnetic member having a first magnetic polarity;
   a transmission unit connected to the body and having a first part, a second part and a third part, the third part threadedly connected between the first and second parts;
   an operation unit connected to the first part;
   a fixed part fixed to the second part;
   a third magnetic member connected to the fixed part and the second part and having a first magnetic polarity and a second magnetic polarity, the first and second polarities of the third magnetic member being located corresponding to the first magnetic polarity of the first magnetic member and the first magnetic polarity of the second magnetic member, the three respective first magnetic polarities being magnetically repulsive to each other, the second magnetic polarity of the third magnetic member being magnetically attracted to the three respective first magnetic polarities, and
   the transmission unit being activated by operation of the operation unit and the third magnetic member being pivoted by the transmission unit so that positions of the first and second magnetic polarities of the third magnetic member are switched.

2. The device as claimed in claim 1, wherein the first part includes a first toothed portion and the second part includes a second toothed portion, the third part includes a third toothed portion and a fourth toothed portion, the third toothed portion is engaged with the first toothed portion of the first part and the fourth toothed portion is engaged with the second toothed portion of the second part.

3. The device as claimed in claim 1, wherein the body has a window and the operation unit is accessible through the window.

4. An operation device for controlling sliding cover of portable electronic product, comprising a body and a sliding cover slidably and linearly connected to the body, the operation device comprising:
   a first magnetic member fixed to a first position of the sliding cover;
   a second magnetic member fixed to a second position of the sliding cover, the first position being located at a distance from the second position, the first magnetic member and the second magnetic member being magnetically impulsive to each other, and
   a third magnetic member pivotably connected to the body and located between the first and second positions of the sliding cover, the third magnetic member having at least a first magnetic polarity which is magnetically impulsive to the first and second magnetic members, a position of the first magnetic polarity being switched to be located corresponding to one of the first and second magnetic members when the third magnetic member is rotated.

5. The device as claimed in claim 4, wherein the third magnetic member has a second magnetic polarity which is located corresponding to the first magnetic polarity, the first and second magnetic polarities are magnetically repulsive to each other, the second magnetic polarity is magnetically attracted to the first and second magnetic members.

6. The device as claimed in claim 5, further comprising a transmission unit pivotably connected to the body and located between the first and second positions of the sliding cover and an operation unit connected to the transmission unit and pivoting the transmission unit, wherein the third magnetic member is connected to the transmission unit which is rotated by operation of the operation unit, and the transmission unit switches the first and second magnetic polarities.

* * * * *